US010623942B2

(12) United States Patent
Jain et al.

(10) Patent No.: US 10,623,942 B2
(45) Date of Patent: Apr. 14, 2020

(54) CELLULAR IOT NETWORK ARCHITECTURE

(71) Applicant: Intel IP Corporation, Santa Clara, CA (US)

(72) Inventors: Puneet Jain, Hillsboro, OR (US); Farid Adrangi, Lake Oswego, OR (US); Muthaiah Venkatachalam, Beaverton, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/284,621

(22) Filed: Feb. 25, 2019

(65) Prior Publication Data
US 2019/0191295 A1 Jun. 20, 2019

Related U.S. Application Data

(63) Continuation of application No. 15/573,153, filed as application No. PCT/US2015/000298 on Dec. 23, 2015.
(Continued)

(51) Int. Cl.
H04W 8/14 (2009.01)
H04W 28/02 (2009.01)
(Continued)

(52) U.S. Cl.
CPC .............. *H04W 8/14* (2013.01); *H04W 4/70* (2018.02); *H04W 12/001* (2019.01);
(Continued)

(58) Field of Classification Search
CPC . H04W 60/00; H04W 28/02; H04W 28/0215; H04W 28/0226; H04W 4/005;
(Continued)

(56) References Cited

U.S. PATENT DOCUMENTS

2010/0260141 A1* 10/2010 Chowdhury .......... H04W 60/04
370/331
2011/0264740 A1 10/2011 Diachina et al.
(Continued)

FOREIGN PATENT DOCUMENTS

CN 107637145 A 1/2018
WO WO-2016200357 A1 12/2016

OTHER PUBLICATIONS

"3GPP; TSG GERAN; Cellular System Support for Ultra Low Complexity and Low Throughput Internet of Things", 3GPP TR 45.820 V1.3.0, [Online] retrieved from the internet:< (http://www.3gpp.org/DynaReport/45820.htm)>, (Jun. 8, 2015).
(Continued)

*Primary Examiner* — Ernest G Tacsik
(74) *Attorney, Agent, or Firm* — Schwegman Lundberg & Woessner, P.A.

(57) ABSTRACT

This document discusses, among other things, a Cellular Internet-of-Things (CIoT) network architecture to enable communication between an apparatus of a CIoT User Equipment (UE) and a network through a CIoT enhanced Node B (eNB) according to a lightweight Non-Access Stratum (NAS) protocol. An apparatus of a CIoT eNB can process data for communication between the CIoT UE and the network. The lightweight NAS protocol supports a reduced set of NAS messages for communication between, for example, the CIoT UE and the CIoT eNB, such as using a modified NAS message, or one or more new messages.

18 Claims, 7 Drawing Sheets

Related U.S. Application Data

(60) Provisional application No. 62/174,110, filed on Jun. 11, 2015.

(51) Int. Cl.

| | | |
|---|---|---|
| *H04W 92/10* | (2009.01) | |
| *H04W 60/00* | (2009.01) | |
| *H04W 4/70* | (2018.01) | |
| *H04W 12/00* | (2009.01) | |
| *H04W 76/14* | (2018.01) | |
| *H04W 60/04* | (2009.01) | |
| H04W 84/04 | (2009.01) | |
| H04L 29/08 | (2006.01) | |

(52) U.S. Cl.
CPC ....... *H04W 28/02* (2013.01); *H04W 28/0215* (2013.01); *H04W 28/0226* (2013.01); *H04W 60/00* (2013.01); *H04W 60/04* (2013.01); *H04W 76/14* (2018.02); *H04W 92/10* (2013.01); *H04L 67/12* (2013.01); *H04W 84/04* (2013.01)

(58) Field of Classification Search
CPC ..... H04W 4/70; H04W 60/04; H04W 76/023; H04W 76/14; H04W 84/04; H04W 8/14; H04W 92/10; H04L 67/12; H05K 999/99
See application file for complete search history.

(56) References Cited

U.S. PATENT DOCUMENTS

| | | | |
|---|---|---|---|
| 2012/0129550 | A1 | 5/2012 | Hannan et al. |
| 2013/0155954 | A1 | 6/2013 | Wang et al. |
| 2013/0308564 | A1* | 11/2013 | Jain ................ H04B 15/00 370/329 |
| 2014/0295824 | A1 | 10/2014 | Madasamy |
| 2014/0301288 | A1* | 10/2014 | Koc ................ H04W 4/70 370/329 |
| 2015/0111520 | A1 | 4/2015 | Hsu |
| 2015/0358910 | A1 | 12/2015 | Tillman et al. |
| 2016/0007213 | A1* | 1/2016 | Cui ................ H04W 4/70 370/230 |
| 2016/0277956 | A1* | 9/2016 | Lindheimer ......... H04W 36/22 |
| 2016/0316496 | A1* | 10/2016 | Dannebro ........... H04W 76/12 |
| 2016/0338005 | A1 | 11/2016 | Lim et al. |
| 2018/0109941 | A1 | 4/2018 | Jain et al. |

OTHER PUBLICATIONS

"U.S. Appl. No. 15/573,153, Examiner Interview Summary dated Aug. 8, 2018", 3 pgs.

"U.S. Appl. No. 15/573,153, Non Final Office Action dated Jul. 9, 2018", 38 pgs.

"U.S. Appl. No. 15/573,153, Notice of Non-Responsive Amendment Received dated Dec. 14, 2018", 5 pgs.

"U.S. Appl. No. 15/573,153, Response filed Feb. 14, 2010 to Notice of Non-Responsive Amendment Received dated Dec. 14, 2018", 7 pgs.

"U.S. Appl. No. 15/573,153, Response filed Sep. 6, 2018 to Non Final Office Action dated Jul. 9, 2018", 9 pgs.

"Discussion on CIoT Architecture", China Mobile Communications Corporation, GP-150396, 3GPP TSG GERAN #66, Vilnius, Lithuania, [Online] retrieved from the internet:< (http://www.3gpp.org/ftp/tsg_geran/TSG_GERAN/GERAN_66_Vilnius/Docs/)>, (May 20, 2015), 1 pg.

"Discussion on MTC Evolution for Cellular IoT", Huawei Technologies Co. Ltd. , GP-140322, 3GPP TSG GERAN #62, [Online] retrieved from the internet: <(http://www.3gpp.org/ftp/tsg_geran/TSG_GERAN/GERAN_62_Valencia/docs/)>, (May 21, 2014), 6 pgs.

"Discussions of Non-Orthogonal Multiple Access in CIoT", Samsung, GP-150378, 3GPP TSG GERAN #66, [Online] retrieved from the internet: <(http://www.3gpp.org/ftp/tsg_geran/TSG_GERAN/GERAN_66_Vilnius/Docs/)>, (May 20, 2015), 7 pgs.

"European Application Serial No. 15895083.2, Response filed Jul. 25, 2018 to Communication pursuant to Rules 161(2) and 162 EPC dated Jan. 18, 2018", 9 pgs.

"European Application Serial No. 15895083.2, Second Response filed Aug. 20, 2018 to Communication pursuant to Rules 161(2) and 162 EPC dated Jan. 18, 2018", 15 pgs.

"Indian Application Serial No. 201747039557, Second Voluntary Amendment filed Aug. 27, 2018", W/ English Claims, 13 pgs.

"Indian Application Serial No. 201747039557, Voluntary Amendment filed Aug. 10, 2018", W/ English Claims, 12 pgs.

"International Application Serial No. PCT/US2015/000298, International Search Report dated Apr. 25, 2016", 4 pgs.

"International Application Serial No. PCT/US2015/000298, Written Opinion dated Apr. 25, 2016", 8 pgs.

"U.S. Appl. No. 15/573,153, Advisory Action dated Jul. 5, 2019", 4 pgs.

"U.S. Appl. No. 15/573,153, Applicant Interview Summary filed Aug. 5, 2019", 1 pg.

"U.S. Appl. No. 15/573,153, Final Office Action dated Apr. 26, 2019", 26 pgs.

"U.S. Appl. No. 15/573,153, Notice of Allowance dated Sep. 20, 2019", 7 pgs.

"U.S. Appl. No. 15/573,153, Response filed Jun. 20, 2019 to Final Office Action dated Apr. 26, 2019", 7 pgs.

"U.S. Appl. No. 15/573,153, Response filed Jul. 18, 2019 to Advisory Action dated Jul. 5, 2019", 9 pgs.

"European Application Serial No. 15895083.2, Communication Pursuant to Article 94(3) EPC dated Oct. 7, 2019", 5 pgs.

"U.S. Appl. No. 15/573,153, 312 Amendment filed Oct. 17, 2019", 6 pgs.

"U.S. Appl. No. 15/573,153, PTO Response to Rule 312 Communication dated Nov. 13, 2019", 2 pgs.

* cited by examiner

CELLULAR IOT NETWORK ARCHITECTURE

CLAIM OF PRIORITY

This application is a continuation of U.S. patent application Ser. No. 15/573,153, filed Nov. 10, 2017, which is a U.S. National Stage Filing under 35 U.S.C. 371 from International Application No. PCT/US2015/000298, filed on Dec. 23, 2015, and published as WO 2016/200357 on Dec. 15, 2016, which claims the benefit of priority of Jain et al., U.S. Provisional Patent Application Ser. No. 62/174,110, entitled "NETWORK AND SECURITY ARCHITECTURE FOR CELLULAR IOT," filed on Jun. 11, 2015, each of which are hereby incorporated by reference herein in their entirety.

TECHNICAL FIELD

This document relates generally to cellular communication and more particularly to network and security architecture for Cellular Internet-of-Things (CIoT) communication.

BACKGROUND

Machine-to-Machine (M2M) communication represents a significant growth opportunity for the 3rd Generation Partnership Project (3GPP) ecosystem. With proliferation of the wireless networks, there is an accelerated push towards connected, smart physical objects, such as wireless sensors, smart meters, dedicated microprocessors, etc., that span different ecosystems with diverse business models.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Next generation mobile networks (NGMN), 5G and beyond, will be characterized by the existence of multiple types of access technologies, multi-layer networks, multiple types of devices, etc. In such an environment, there is a fundamental need for enablers to achieve seamless and consistent user experience across time and space.

The present inventors have recognized, among other things, network and security architecture for communication between Cellular Internet-of-Things (CIoT) devices (e.g., User Equipment (UE)) and a network (e.g., according to 3GPP standards) that address one or more of the following usage scenarios: low throughput; delay tolerant; power efficient (e.g., having battery life of years or greater); coverage in challenging conditions (e.g., indoor and underground); and ultra-low cost, to be disposable or deployable on a mass scale.

Figure 1:
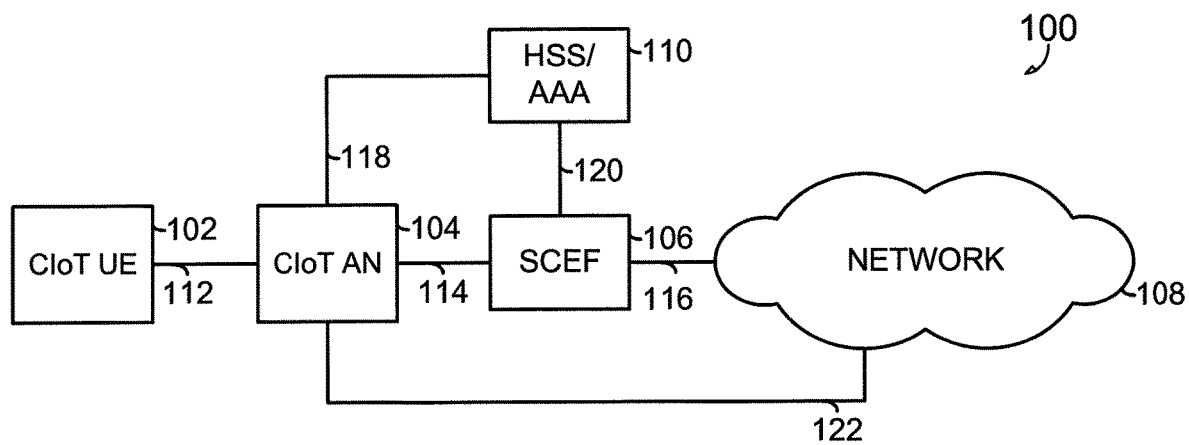
FIG. 1 illustrates generally an example Cellular Internet-of-Things (CIoT) network architecture including a CIoT User Equipment (UE), a CIoT Access Network (CAN), and a network.
Figure 3:
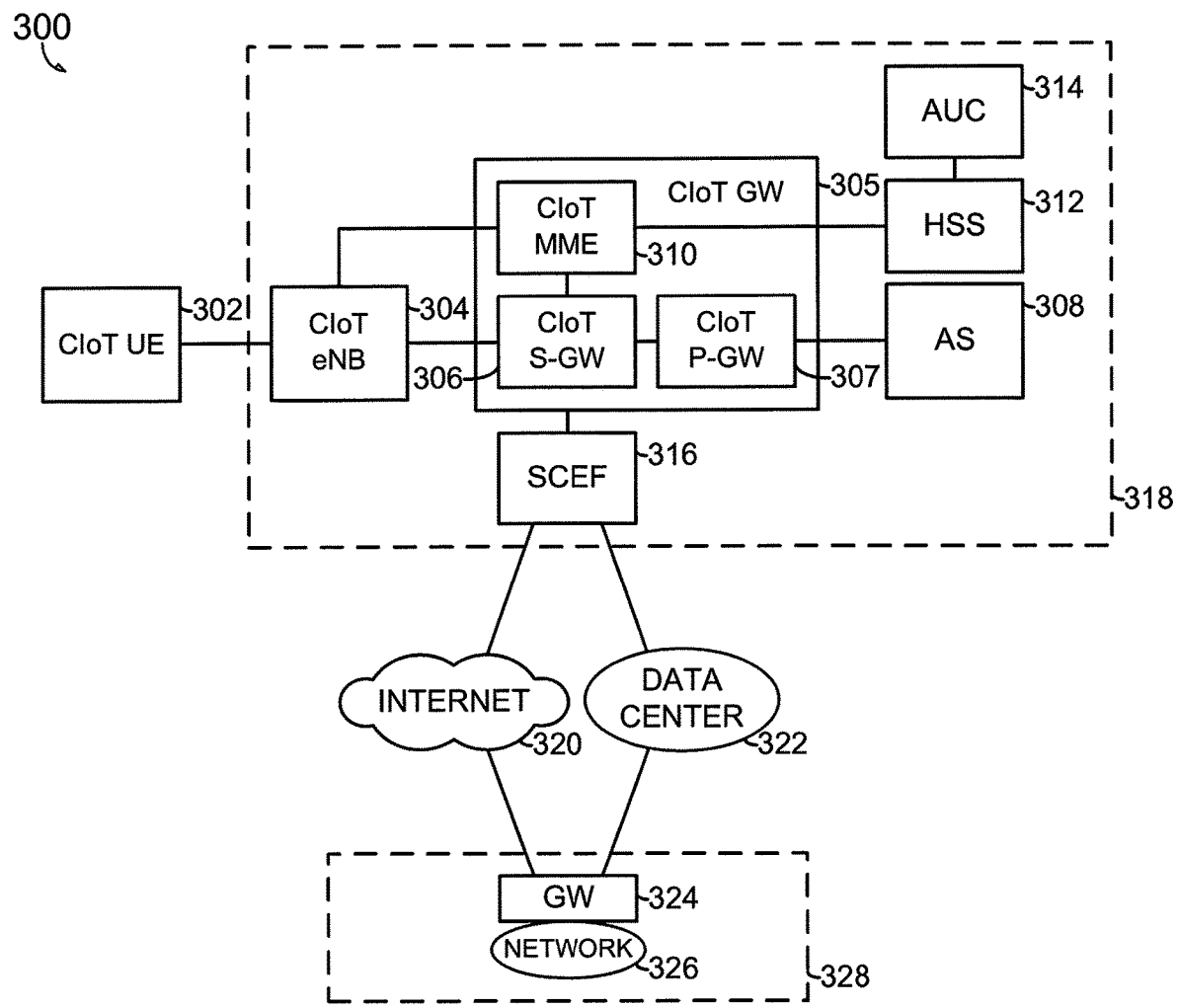
FIG. 3 illustrates generally an example CIoT network security architecture.

FIG. 1 illustrates generally an example CIoT network architecture 100 (e.g., clean slate architecture) including a Cellular Internet-of-Things (CIoT) User Equipment (UE) 102 configured to communicate with a network 108 through a CIoT Access Network (CAN) 104. The CAN 104 can include a CIoT Base Station, such as an CIoT enhanced Node B (eNB), and a CIoT Gateway (GW), such as illustrated in FIG. 3, below.

Figure 7:
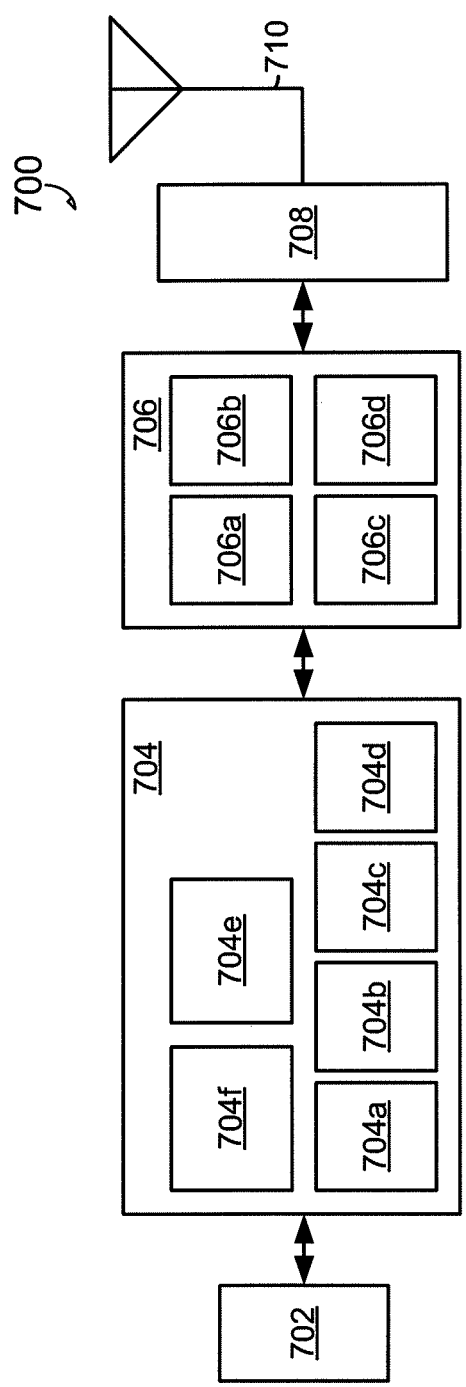
FIG. 7 illustrates generally a block diagram of an example UE upon which one or more embodiments may be implemented.

In an example, the CIoT UE 102 can include, among other things, processing circuitry and a radio interface, such as illustrated in FIG. 7, below. The processing circuitry can process data for communication with the network 108 through the CAN 104 according to a lightweight Non-Access Stratum (NAS) protocol, and the radio interface can communicate with the CAN 104 using a first reference point (C1) 112, such as a narrowband air interface, for example, based on one or more clean slate, low-power, wide area technology, such as narrowband Orthogonal Frequency-Division Multiplexing (OFDM), SIGFOX, Neul, etc.).

In an example, the lightweight NAS protocol can support a reduced set of NAS messages for communication between the CIoT UE 102, or one or more other CIoT devices, and the CAN 104. The lightweight NAS protocol can terminate on the network 108 side of the CAN 104, such as in a CIoT GW, etc. In an example, the reduced set of NAS messages is exclusive of mobile NAS messages (e.g., messages required to support mobility), such as, in certain examples, at least one of handover (HO) or tracking area update (TAU). In certain examples, the processing circuitry of the CIoT UE 102 can be configured to receive a modified NAS message that includes communication data from the network 108, or to modify an existing NAS message to include data for communication to the network 108. In certain examples, the lightweight NAS protocol can support simple uplink and downlink data transport between the CIoT UE 102 and the network 108, such as through the CAN 104 or one or more other network component, that can piggy back on an existing initial entry message, such as one or more of an attach message, a service request message, or one or more other periodic messages (e.g., periodic TAU, etc.). In other examples, one or more other new lightweight transport messages can be defined.

In this example, the CIoT network architecture 100 includes a Service Capability Exposure Function (SCEF) module 106, and a Home Subscriber Server (HSS) or an Authentication, Authorization, and Accounting (AAA) server 110, or a server having one or more HSS/AAA functions. The network 108 can include a packet data network, an operator network, or a cloud service network, having, for example, among other things, a Service Capability Server (SCS), an Application Server (AS), or one or more other external servers or network components.

The CAN 104 can be coupled to the HSS/AAA server 110 using a second reference point (C2) 118, including, for example, an air interface based on an S6a reference point, and configured to authenticate/authorize CIoT UE 102 access to the CAN 104. The CAN 104 can be coupled to the network 108 using a third reference point (C3) 122, including, for example, an air interface corresponding to an SGi/Gi interface for 3GPP accesses. The CAN 104 can be coupled to the SCEF module 106 using a fourth reference point (C4) 114, including, for example, an air interface based on a T6a/T6b reference point, for service capability exposure. The SCEF module 106 may act as an API GW towards a 3rd party application server. The SCEF 106 can be coupled to the HSS/AAA server 110 using an S6t reference point, and to the network 108 using an Application Programming Interface (API) 116.

In certain examples, one or more of the CIoT devices disclosed herein, such as the CIoT UE 102, the CIoT AN 104, etc., can include one or more other non-CIoT devices, or non-CIoT devices acting as CIoT devices, or having functions of a CIoT device. For example, the CIoT UE 102 can include a smart phone, a tablet computer, or one or more other electronic device acting as a CIoT device for a specific function, while having other additional functionality.

Figure 2:
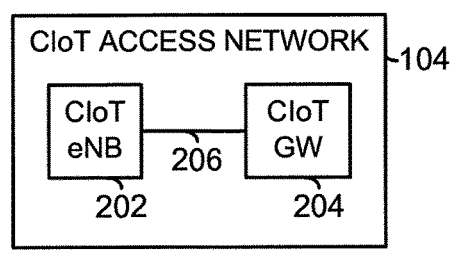
FIG. 2 illustrates generally an example CIoT Access Network (CAN) including a CIoT enhanced Node B (CIoT eNB) and a CIoT Access Network Gateway (GW).

FIG. 2 illustrates generally an example CIoT Access Network (CAN) 104 including a CIoT enhanced Node B (CIoT eNB) 202 and a CIoT Access Network Gateway (GW) 204. In certain examples, the CAN 104 can include multiple base stations (e.g., CIoT eNBs) connected to the CIoT GW 204. In certain examples, internal architecture of CAN 104 may be left to the implementation and need not be standardized.

In an example, the CIoT GW 204 can include functionality of one or more of an Evolved Packet System (EPS) Mobile Management Entity (MME), Serving Gateway (S-GW), and Packet Gateway (P-GW). The CIoT eNB 202 can be coupled to the CIoT GW 204 using a connectionless S1-lite interface, such as disclosed in the commonly assigned Jain et al., U.S. application Ser. No. 14/126,252, titled "Always-On Bearer for Small Data Transfers in LTE Systems," included by reference herein in its entirety, including its disclosure of an S1-U interface between the eNB and the S-GW.

An apparatus of the CAN 104 may perform, among other things, one or more of: authentication; authorization; UE reachability procedures; packet routing and forwarding; mobility anchor; L2 data tunneling with CIoT UE; or DHCP client, such as a destination IP for an application server.

In an example, one or more of the CIoT eNB 202 or the CIoT GW 204 can include processing circuitry and a radio interface, similar to that in the CIoT UE described in FIGS. 1 and 7. In an example, the processing circuitry can process data for communication between CIoT UE and a network according to the lightweight NAS protocol, such as described herein, and the radio interface can communicate with the CIoT UE using a first reference point, such as the first reference point (C1) 112 described above. In an example, the processing circuitry can modify an existing NAS message, or create a new message, to include data for communication to the CIoT UE, or receive data in a modified NAS message, or a new message, from the CIoT UE for communication to the network. In an example, the existing NAS message includes an attach message or a service request message, or, in certain examples, one or more periodic messages, such as a periodic tracking area update (TAU) message.

FIG. 3 illustrates generally an example CIoT network security architecture 300 having two deployment options: within an operator network 318; and within a service provider network 328 (e.g., Google, Google cloud, etc.).

The operator network 318 can include, for example, a CIoT eNB 304, a CIoT GW 305, an Application Server (AS) 308, a Home Subscriber Server (HSS) 312, an Authentication Center (AUC) 314, and a Service Capability Exposure Function (SCEF) module 316. The CIoT GW 305 can include one or more functions of an MME, an S-GW, or a P-GW. Accordingly, the CIoT GW 305 of FIG. 3 includes a CIoT S-GW 306, a CIoT P-GW 307, and a CIoT MME 310.

The CIoT eNB 304 can be coupled to the CIoT GW 305, for example, to the CIoT S-GW 306, using an S1-lite interface, such as described above. The CIoT GW 305 can be coupled to the AS 308, such as through the CIoT P-GW 307, using an SGi interface. The CIoT S-GW 306 can be coupled to the CIoT MME 310 using a C2 interface, and the CIoT MME 310 to the HSS 312. The CIoT GW 305 can be coupled to the SCEF 316 using a C4 interface, such as between the CIoT MME 310 and the SCEF 316. In other examples, one or more of these components can be omitted, or other interfaces can be used.

The service provider network 328 can be coupled to the operator network 318 using, for example, a network 320 (e.g., using the internet) or a data center 322, and can include, among other things, a Gateway (GW) 324 and a network 326.

When service application is outside the operator network 318, and within the service provider network 328, the CIoT GW 305 can be placed directly after the CIoT eNB 304. The CIoT GW 305 can be the bridge (for the data plane) between the operator network 318 and the service provider network 328. Encrypted Layer 2 packets from the CIoT UE 302 can be tunneled from the CIoT eNB 304 to the CIoT GW 305. In this example, the CIoT network security architecture 300 can deploy one or more security solutions, such as Hop-by-hop security, Application security, etc. Hop-by-hop security can provide security between the CIoT UE 302 and the CIoT GW 305, or between the CIoT GW 305 and the service provider network GW 324. Application security can provide end-to-end security between the CIoT UE 302 and an application server inside the operator network 318 (e.g., a cloud service network).

When service application is inside the operator network 318, an application server (AS) 308 can be placed inside the home network, and encrypted Layer 2 packets from the CIoT UE 302 can be tunneled from the CIoT eNB 304 to the AS 308. In this example, the CIoT network security architecture 300 can deploy one or more security solutions, such as Hop-by-hop security, Application security, etc. Application security can be used between the CIoT UE 302 and the AS 308. Hop-by-hop security can be used between the CIoT UE 302 and the CIoT eNB 304, or between the CIoT eNB 304 and the AS 308.

In an example, when an application server (AS) resides in a remote cloud service network, the CIoT UE 302 can authenticate to a network (e.g., a network 326 of service provider network) using UMTS-AKA with a specific APN that indicates the CIoT UE 302 is layer-2 COIT. Upon successful authentication, security end-points can be established between the CIoT UE 302 and the Security GW, and the CIoT MME 310 can send KASME, the CIoT UE 302 layer-2 address, and APN address (e.g., can map to cloud application server IP address) to the Security GW over I2. The CIoT MME 310 can set a state in the CIoT eNB 304 indicating layer-2 forwarding for this CIoT UE 302 over I2.

The Security GW can create a routing table based on the information received over I2 for this CIoT UE 302.

Further, when the AS resides in a remote cloud service network, packet flow from the CIoT UE 302 to the cloud application server can include encrypted layer-2 payload to the CIoT eNB 304 from the CIoT UE 302. The CIoT eNB 304 can forward the encrypted layer-2 payload to the CIoT GW 305 over I1. The Security GW can decrypt the layer-2 payload, and tunnel the payload to the cloud security gateway over an encrypted pipe. Packet flow from the cloud application server to the CIoT UE 302 can be the reverse of above.

Figure 4:
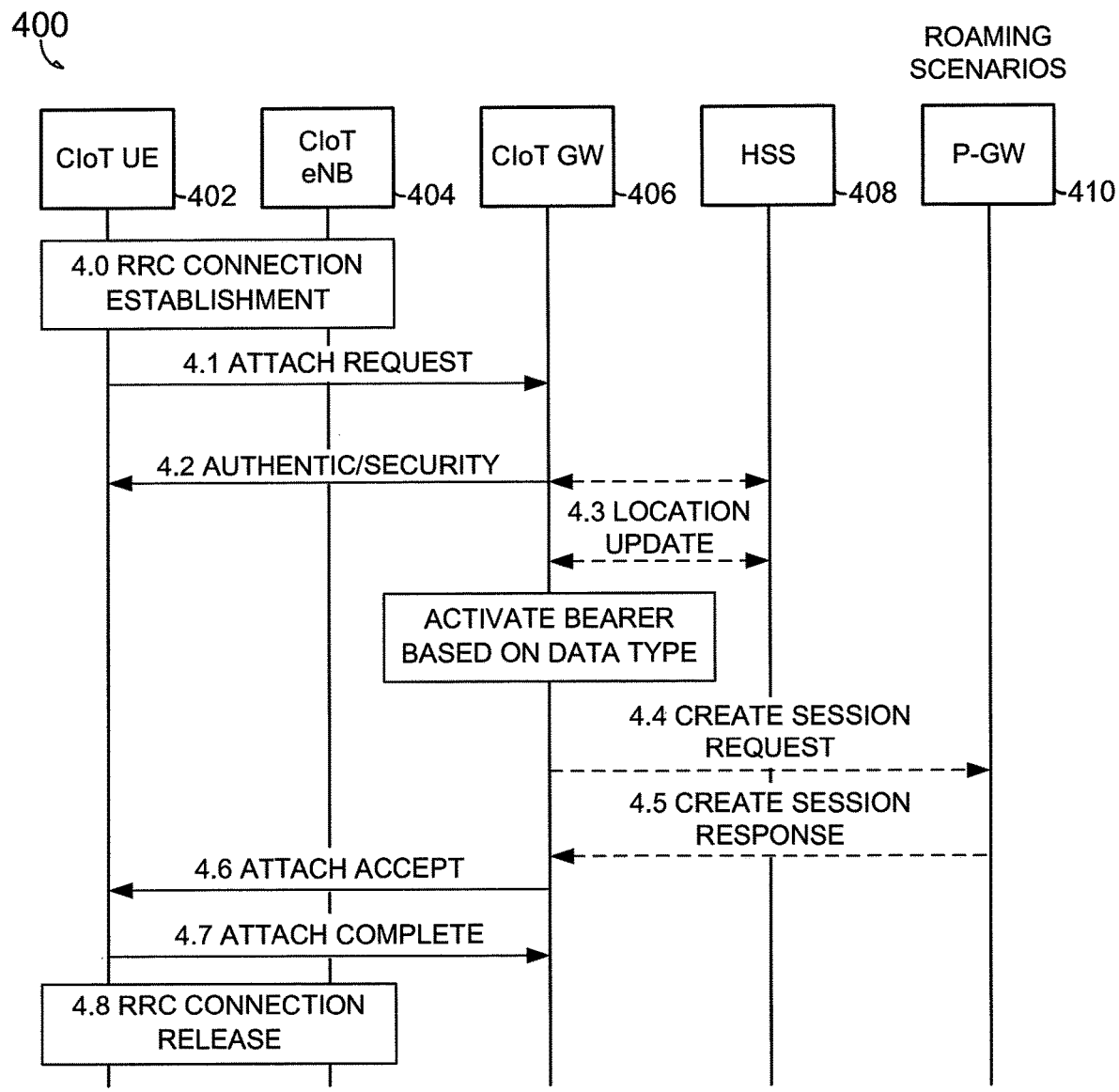
FIG. 4 illustrates generally an example CIoT attach procedure.

FIG. 4 illustrates generally an example CIoT attach procedure 400 including a CIoT UE 402, a CIoT eNB 404, a CIoT GW 406, an HSS 408, and, in roaming scenarios, a Packet Data Network Gateway (P-GW) 410. In certain examples, as used herein, the CIoT GW 406, or one or more other CIoT GW referenced herein, can be referred to as a CIoT Serving Gateway Node (C-SGN).

At 4.0, an RCC connection can be established. At 4.1, the CIoT UE 402 performs an Attach Procedure, for example, sending an Attach Request (e.g., CIoT Attach, Data Type) to the CIoT GW 406, such as through the CIoT eNB 404. During the Attach Procedure, the CIoT UE 402 can indicate that this attach is for CIoT communication. The CIoT eNB 404 can select a CIoT GW 406 optimized for CIoT based on the UE indication or based on one or more pre-configurations. The CIoT UE can also indicate a specific Data Type (e.g. IP, non-IP, SMS, or a combination of one or more of these or others). Further, an APN may be indicated.

At 4.2, the CIoT GW 406 can perform any necessary authentication or security procedures. At 4.3, a location update and retrieval of subscription information can optionally occur. In certain examples, this and other functions noted with a dotted line can be omitted, depending on the requirements of communication between the CIoT UE and CIoT eNB 404, or the type of CIoT UE 402.

At 4.4, the CIoT GW 406 can processes the Attach Request message and, in the roaming scenario, send a Create Session Request (e.g., a CIoT Attach, Data Type, etc.) to the P-GW 410. In certain examples, based on parameters provided, an IP Bearer service can be established.

For example, for a Data Type of IP, the PDN type can indicate a type of IP address (e.g., IPv4, IPv6) to be allocated. the CIoT GW 406 can allocate an IP address based on the PDN type in the attach request. In certain examples, NAS Session Management Signaling is not required. In the roaming case, the CIoT GW 406 can send a Create Session Request to the P-GW 410 to indicate that this is an Attach for a CIoT UE and Data Type. The P-GW 410 can allocate an IP address based on the PDN type in the Attach Request.

For a Data Type of non-IP, the CIoT GW 406 does not run any IP-related operation (e.g., IP address allocation, etc.). Based on the configuration, the CIoT GW 406 may establish a direct forwarding path (e.g., a point-to-point tunnel on per UE, per PDN basis, towards AS, etc.). Alternatively, based on the configuration and if an SCEF is deployed, the CIoT GW 406 may decide to route small data via the SCEF. In this case, no Create Session Request is required to be sent to the P-GW 410. In certain examples, the configuration can be based on criterion such as an SLA between an operator and a third party application service provider, or one or more other criterion.

For a Data Type of SMS, the CIoT GW 406 is not required to allocate an IP address, or send a Create Session Request to the P-GW 410.

At 4.5, during roaming scenarios, and depending on the Data Type, the P-GW 410 may send a Create Session response (or a new control message) to the CIoT GW 406. For the IP data case, the response can contain the allocated IP address.

At 4.6, the CIoT GW 406 can send a an Attach Accept (e.g., CIoT Attach) to the CIoT UE 402, such as through the CIoT eNB 404, for example, without any session management message. For a Data Type of IP, an allocated IP address can be sent to the CIoT UE 402.

At 4.7, the CIoT UE 402 can respond with an Attach Complete message, and, at 4.8, the RRC connection can be released.

Figure 5:
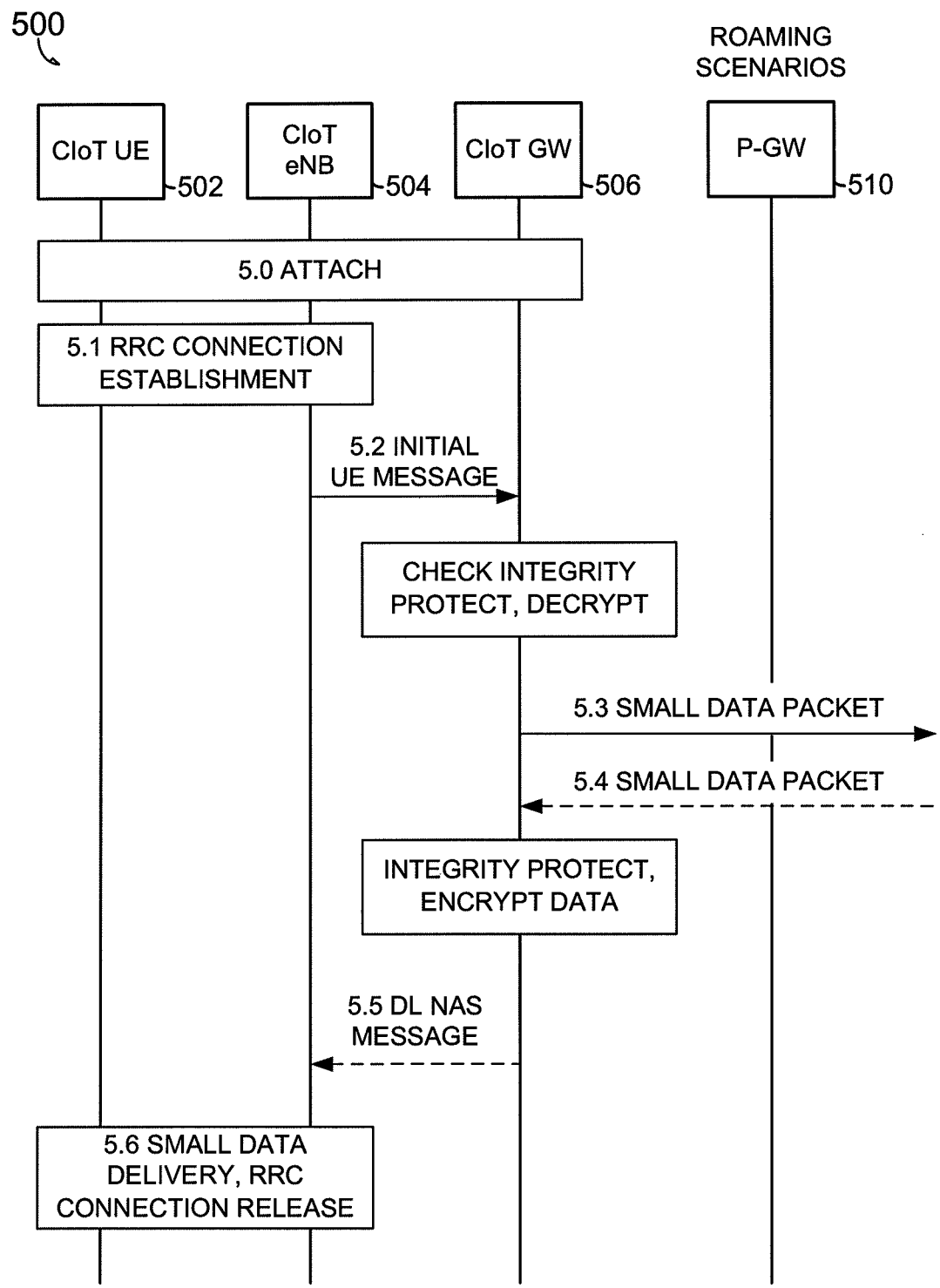
FIG. 5 illustrates generally an example CIoT mobile originated (MO) small data transfer.

FIG. 5 illustrates generally an example CIoT mobile originated (MO) small data transfer 500 including a CIoT UE 502, a CIoT eNB 504, a CIoT GW 506, and, in roaming scenarios, a Packet Data Network Gateway (P-GW) 510.

At 5.0, an Attach Procedure can be performed, such as described above in FIG. 4. At 5.1, the CIoT UE 502 requests that an AS establish an RRC connection. In an example, a new NAS message format can be used to carry the small data packet (e.g., IP, non-IP, SMS) in an encrypted Information Element (IE), such as a NAS PDU. The CIoT UE 502 can also indicate whether acknowledgment/response to the small data packet is expected or not. There is no need to set up DRB and AS security.

In an example, the NAS PDU can include an unencrypted part including eKSI or Sequence Number IEs as per usual for encrypted NAS messages. The CIoT GW 506 can use the IE, and the S-TMSI, to identify the security context to decrypt the small data packet.

At 5.2, the CIoT eNB 504 (e.g., a CIoT RAN) can forward the initial UE message to the CIoT GW 506. The initial UE message can include a NAS PDU, encrypted data, and an acknowledgement/response indication. In the case of multiple small data packet transmission, subsequent small data packets may be contained in UL NAS transport without establishment of an RRC connection.

The CIoT GW 506 can check integrity protection and decrypt the NAS message, obtaining the small data packet. At 5.4, the CIoT GW 506 forwards the small data packet using appropriate mechanisms depending on Data Type.

For example, the CIoT GW 506 may send IP small data over SGi. In roaming case, the data may traverse through the P-GW 510. The CIoT GW 506 may send SMS to SMS-SC/IWMSC. In certain examples, the procedure can be the same as over an SGd interface defined for SMS in MME in Annex C of TS 23.272. The CIoT GW 506 may send non-IP small data, depending on the configuration, to SCEF or to AS using point-to-point forwarding tunnel.

At 5.4, if no acknowledgment/response to the small data packet is expected (based on the subscriber information and the Ack/Rsp indication from the UE), the CIoT GW 506 can immediately release the connection. Otherwise, the CIoT GW 506 or the P-GW 510 (in case of roaming) can receive a (response) small data packet.

At 5.5, the CIoT GW 506 can encrypt the NAS message with the downlink small data packet and send the downlink NAS message to the CIoT eNB 502 (e.g., to a CIoT-RAN). The CIoT GW 506 may then release the signalling connection after the timer monitoring the connection expires.

At 5.6, the CIoT eNB 504 can send the Downlink RRC message (e.g., including the NAS message) to the CIoT UE 502, and release the RRC connection after the timer monitoring the connection expires.

Figure 6:
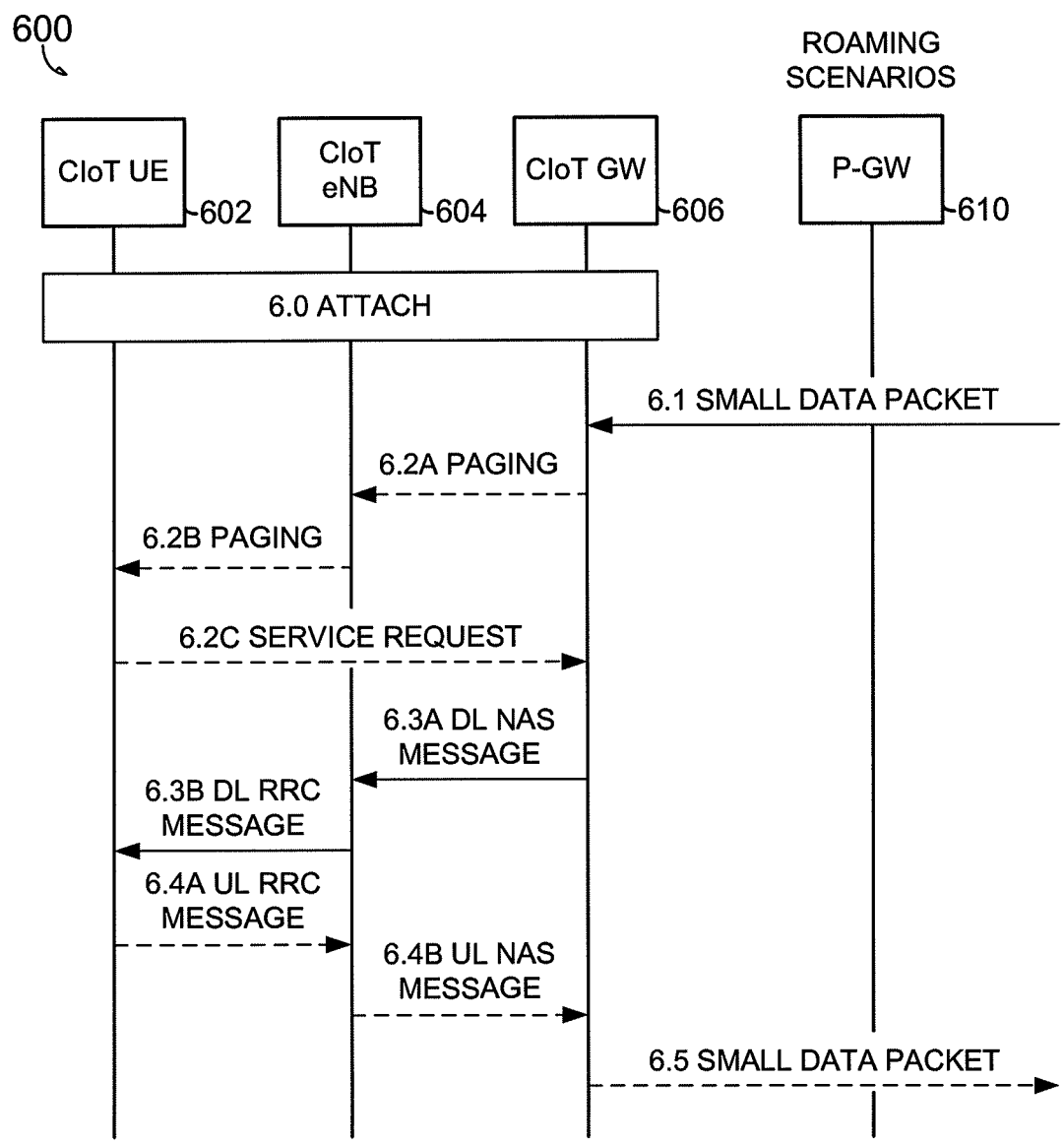
FIG. 6 illustrates generally an example CIoT mobile terminated (MT) small data transfer.

FIG. 6 illustrates generally an example CIoT mobile terminated (MT) small data transfer 600, including a CIoT UE 602, a CIoT eNB 604, a CIoT GW 606, and, in roaming scenarios, a Packet Data Network Gateway (P-GW) 610.

At 6.0, an Attach Procedure can be performed, such as described above in FIG. 4. At 6.1, the CIoT GW 606 receives a small data packet (e.g., IP, non-IP, SMS). At 6.2, if there is no signalling connection with the CIoT UE 502, the CIoT GW 606 buffers the received small data packet, and pages the CIoT UE 502, which then sends the Service Request message to CIoT GW 606.

At 6.3, the CIoT GW 606 sends the small data packet in an encrypted IE in a NAS PDU in a Downlink NAS message and the CIoT eNB 604 sends the NAS PDU to the CIoT UE 502. In certain examples, DRB and AS security is not required.

At 6.4, the CIoT UE 502 optionally sends a packet as an acknowledgement in an encrypted IE in a NAS PDU in an UL RRC message. The CIoT eNB 604 can forward the NAS PDU to the CIoT GW 606. After the timer monitoring the connection expires, the CIoT GW 606, the CIoT UE 502, and the CIoT eNB 604 release the connection locally.

At 6.5, the CIoT GW 606 optionally decrypts and forwards the NAS-PDU to an appropriate node, for example, depending on Data Type.

FIG. 7 illustrates generally a block diagram of an example UE 700 (e.g., a CIoT UE) upon which one or more embodiments may be implemented. In an example, the UE 700 may include application circuitry 702, baseband circuitry 704, Radio Frequency (RF) circuitry 706, front-end module (FEM) circuitry 708 and one or more antennas 710, coupled together at least as shown. As used with reference to FIG. 7, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 704 may include circuitry such as, but not limited to, one or more single-core or multi-core processors. The baseband circuitry 704 may include one or more baseband processors and/or control logic to process baseband signals received from a receive signal path of the RF circuitry 706 and to generate baseband signals for a transmit signal path of the RF circuitry 706. Baseband processing circuitry 704 may interface with the application circuitry 702 for generation and processing of the baseband signals and for controlling operations of the RF circuitry 706. For example, the baseband circuitry 704 may include a second generation (2G) baseband processor 704*a*, third generation (3G) baseband processor 704*b*, fourth generation (4G) baseband processor 704*c*, and/or other baseband processor(s) 704*d* for other existing generations, generations in development or to be developed in the future (e.g., fifth generation (5G), 6G, etc.). The baseband circuitry 704 (e.g., one or more of baseband processors 704*a-d*) may handle various radio control functions that enable communication with one or more radio networks via the RF circuitry 706. The radio control functions may include, but are not limited to, signal modulation/demodulation, encoding/decoding, radio frequency shifting, etc. In an example, modulation/demodulation circuitry of the baseband circuitry 704 may include Fast-Fourier Transform (FFT), precoding, and/or constellation mapping/demapping functionality. In an example, encoding/decoding circuitry of the baseband circuitry 704 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In an example, the baseband circuitry 704 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 704*e* of the baseband circuitry 704 may be configured to run elements of the protocol stack for signaling of the PHY, MAC, RLC, PDCP and/or RRC layers. In an example, the baseband circuitry may include one or more audio digital signal processor(s) (DSP) 704*f*. The audio DSP(s) 704*f* may be include elements for compression/decompression and echo cancellation and may include other suitable processing elements in other embodiments. In an example, components of the baseband circuitry may be suitably combined in a single chip, a single chipset, or disposed on a same circuit board. In an example, some or all of the constituent components of the baseband circuitry 704 and the application circuitry 702 may be implemented together such as, for example, on a system on a chip (SOC).

In an example, the baseband circuitry 704 may provide for communication compatible with one or more radio technologies. For example, the baseband circuitry 704 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In an example, the RF circuitry 706 may include a receive signal path and a transmit signal path. The receive signal path of the RF circuitry 706 may include mixer circuitry 706*a*, amplifier circuitry 706*b* and filter circuitry 706*c*. The transmit signal path of the RF circuitry 706 may include filter circuitry 706*c* and mixer circuitry 706*a*. RF circuitry 706 may also include synthesizer circuitry 706*d* for synthesizing a frequency for use by the mixer circuitry 706*a* of the receive signal path and the transmit signal path. In an example, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 704 for further processing. In an example, the output baseband signals may be zero-frequency baseband signals, although this is not a requirement. In an example, mixer circuitry 706a of the receive signal path may comprise passive mixers, although the scope of the embodiments is not limited in this respect.

In an example, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 704 and may be filtered by filter circuitry 706c. The filter circuitry 706c may include a low-pass filter (LPF), although the scope of the embodiments is not limited in this respect.

In an example, the mixer circuitry 706a of the receive signal path and the mixer circuitry 706a of the transmit signal path may include two or more mixers and may be arranged for quadrature downconversion and/or upconversion respectively. In an example, the mixer circuitry 706a of the receive signal path and the mixer circuitry 706a of the transmit signal path may include two or more mixers and may be arranged for image rejection (e.g., Hartley image rejection). In an example, the mixer circuitry 706a of the receive signal path and the mixer circuitry 706a may be arranged for direct downconversion and/or direct upconversion, respectively. In an example, the mixer circuitry 706a of the receive signal path and the mixer circuitry 706a of the transmit signal path may be configured for super-heterodyne operation.

In an example, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In a dual-mode example, a separate radio IC circuitry may be provided for processing signals for each spectrum, although the scope of the embodiments is not limited in this respect.

In an example, the synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In an example, the synthesizer circuitry 706d may be a fractional N/N+1 synthesizer.

In an example, frequency input may be provided by a voltage controlled oscillator (VCO), although that is not a requirement. Divider control input may be provided by either the baseband circuitry 704 or the applications processor 702 depending on the desired output frequency. In an example, a divider control input (e.g., N) may be determined from a look-up table based on a channel indicated by the applications processor 702.

Synthesizer circuitry 706d of the RF circuitry 706 may include a divider, a delay-locked loop (DLL), a multiplexer and a phase accumulator. In an example, the divider may be a dual modulus divider (DMD) and the phase accumulator may be a digital phase accumulator (DPA). In an example, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In an example, synthesizer circuitry 706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In an example, the output frequency may be a LO frequency (fLO). In an example, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 710.

In an example, the FEM circuitry 708 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710.

In an example, the UE 700 may include additional elements such as, for example, memory/storage, display, camera, sensor, and/or input/output (I/O) interface.

Figure 8:
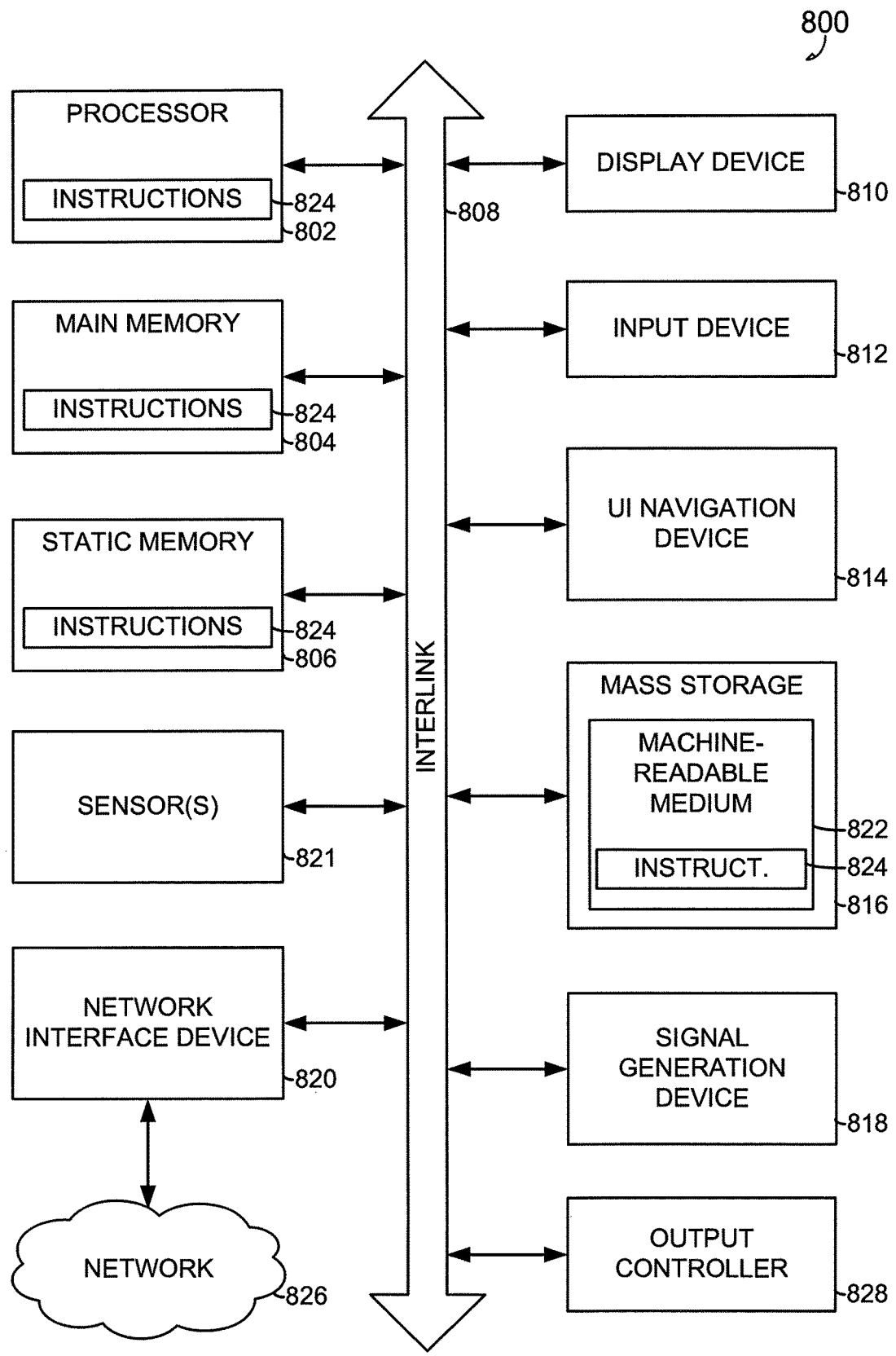
FIG. 8 illustrates generally a block diagram of an example machine upon which any one or more of the techniques discussed herein may perform.

FIG. 8 illustrates generally a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810 (e.g., a raster display, vector display, holographic display, etc.), an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as WiFi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

Embodiments of the technology herein may be described as related to the Third Generation Partnership Project (3GPP) long term evolution (LTE) or LTE-advanced (LTE-A) standards. For example, terms or entities such as eNodeB (eNB), mobility management entity (MME), user equipment (UE), etc., may be used that may be viewed as LTE-related terms or entities. However, in other embodiments the technology may be used in or related to other wireless technologies such as the IEEE 802.16 wireless technology (WiMax), IEEE 802.11 wireless technology (WiFi), various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed. In those embodiments, where LTE-related terms such as eNB, MME, UE, etc. are used, one or more entities or components may be used that may be considered to be equivalent or approximately equivalent to one or more of the LTE-based terms or entities.

Additional Notes and Examples

Example 1 may include a User Equipment (UE) configured to operate as a special Cellular IoT Device.

Example 2 may include the UE in example 1 or some other example herein, wherein the UE is to interface with a CIoT Access Network (CAN) over a C1 reference point.

Example 3 may include the UE in example 1 or some other example herein, wherein the UE is to support a lightweight NAS protocol where UL/DL data transport is supported over new radio type interfacing with CIoT Access Network (CAN) over C1 reference point.

Example 4 may include the UE in example 1 or some other example herein, wherein the UE is to support a L2 tunnel for data transfer to CAN.

Example 5 may include a network comprising one or more Cellular IoT Access Gateways (CANs).

Example 6 may include the network in example 1 or 5 or some other example herein, where CIoT GW Supporting lightweight NAS protocol where UL/DL data transport is supported over new radio type interfacing with CIoT UE over C1 reference point.

Example 7 may include the network in example 1 or 5 or some other example herein, Supporting L2 tunnel for data transfer to/from UE.

Example 8 may include the network in example 1 or 5 or some other example herein, Supporting S1-Lite interface towards eNB.

Example 9 may include the network in example 1 or 5 or some other example herein, Supporting sub-set of functionality of MME, S-GW, P-GW.

Example 10 may include the network in example 1 or 5 or some other example herein, Supporting C2 reference point towards MME for exchange of authentication parameters.

Example 11 may include the network in example 1 or 5 or some other example herein, Supporting C2 reference point towards HSS/AAA for exchange of authentication parameters.

Example 12 may include the network in example 1 or 5 or some other example herein, Supporting C4 reference point towards SCEF for exchange of information with Application Servers.

Example 13 may include the network in example 1 or 5 or some other example herein, Supporting C3 reference point towards AS for exchange of IP data.

Example 14 may include an apparatus comprising means to perform one or more elements of a method described in or related to any of examples 1-13, or any other method or process described herein.

Example 15 may include one or more non-transitory computer-readable media comprising instructions to cause an electronic device, upon execution of the instructions by one or more processors of the electronic device, to perform one or more elements of a method described in or related to any of examples 1-13, or any other method or process described herein.

Example 16 may include an apparatus comprising control logic, transmit logic, and/or receive logic to perform one or more elements of a method described in or related to any of examples 1-13, or any other method or process described herein.

Example 17 may include a method of communicating in a wireless network as shown and described herein.

Example 18 may include a system for providing wireless communication as shown and described herein.

Example 19 may include a device for providing wireless communication as shown and described herein.

Example 20 is an apparatus of a Cellular Internet-of-Things (CIoT) User Equipment (UE), the apparatus comprising: processing circuitry to process data for communication with a network through a CIoT enhanced Node B (eNB) according to a lightweight Non-Access Stratum (NAS) protocol; and a radio interface to communicate with the CIoT eNB using a first reference point.

In Example 21, the subject matter of Example 20 optionally includes, wherein the lightweight NAS protocol supports a reduced set of NAS messages for CIoT devices exclusive of mobile NAS messages.

In Example 22, the subject matter of Example 21 optionally includes, wherein the mobile NAS messages include at least one of attach or tracking area update (TAU).

In Example 23, the subject matter of any one or more of Examples 20-22 optionally include, wherein the processing circuitry is configured to receive a modified NAS message that includes communication data from the network.

In Example 24, the subject matter of any one or more of Examples 20-23 optionally include, wherein the processing circuitry is configured to modify an existing NAS message to include data for communication to the network.

In Example 25, the subject matter of any one or more of Examples 20-24 optionally include, wherein the CIoT eNB is configured to communicate with the CIoT UE and to terminate the first reference point, wherein the first reference point is a narrow-band air interface between the CIoT UE and the CIoT eNB, and wherein the network is an operator network or a cloud service network.

Example 26 is an apparatus of a Cellular Internet-of-Things (CIoT) enhanced Node B (eNB), the apparatus comprising: processing circuitry to process data for communication between a CIoT User Equipment (UE) and a network according to a lightweight Non-Access Stratum (NAS) protocol; and a radio interface to communicate with the CIoT UE using a first reference point.

In Example 27, the subject matter of Example 26 optionally includes, wherein the lightweight NAS protocol supports a reduced set of NAS messages for CIoT devices exclusive of mobile NAS messages.

In Example 28, the subject matter of Example 27 optionally includes, wherein the mobile NAS messages include at least one of attach or tracking area update (TAU).

In Example 29, the subject matter of any one or more of Examples 26-28 optionally include, wherein the processing circuitry is configured to modify an existing NAS message to include data for communication to the CIoT UE.

In Example 30, the subject matter of Example 29 optionally includes, wherein the existing NAS message includes an attach message or a service request message.

In Example 31, the subject matter of any one or more of Examples 29-30 optionally include, wherein the existing NAS message includes a periodic tracking area update (TAU) message.

In Example 32, the subject matter of any one or more of Examples 26-31 optionally include, wherein the processing circuitry is configured to receive data for communication to the network in a modified NAS message from the CIoT UE.

In Example 33, the subject matter of any one or more of Examples 26-32 optionally include, wherein the CIoT eNB is a component of a CIoT Access Network (CAN) including a CIoT Gateway (GW) coupled to a plurality of CIoT eNBs, wherein the CIoT GW is configured to communicate with the network using a second reference point, wherein the first reference point is a narrow-band air interface between the CIoT UE and the CIoT eNB, and the second reference point includes an air interface between the CIoT GW and the network, and wherein the network is an operator network or a cloud service network.

In Example 34, the subject matter of Example 33 optionally includes, wherein the CIoT GW includes functionality of at least one of a Mobile Management Entity (MME), Serving Gateway (S-GW), and Packet Data Network Gateway (P-GW).

Example 35 is at least one machine readable medium of a Cellular Internet-of-Things (CIoT) User Equipment (UE), the machine readable medium including instructions that, when executed by the CIoT UE, configure the CIoT UE to: process data for communication with a network through a CIoT enhanced Node B (eNB) according to a lightweight Non-Access Stratum (NAS) protocol using processing circuitry; and communicate with the CIoT eNB using a radio interface and a first reference point.

In Example 36, the subject matter of Example 35 optionally includes, wherein the lightweight NAS protocol supports a reduced set of NAS messages for CIoT devices exclusive of mobile NAS messages, wherein the first reference point is a narrow-band air interface between the CIoT UE and the CIoT eNB, and wherein the mobile NAS messages including at least one of attach or tracking area update (TAU).

In Example 37, the subject matter of any one or more of Examples 35-36 optionally include, the machine readable medium including instructions that, when executed by the CIoT UE, configure the CIoT UE to: receive a modified NAS message that includes communication data from the network; or modify an existing NAS message to include data for communication to the network.

Example 38 is at least one machine readable medium of a Cellular Internet-of-Things (CIoT) enhanced Node B (eNB), the machine readable medium including instructions that, when executed by the CIoT eNB, configure the CIoT eNB to: process data for communication between a CIoT User Equipment (UE) and a network according to a lightweight Non-Access Stratum (NAS) protocol using processing circuitry; and communicate with the CIoT UE using a radio interface and a first reference point.

In Example 39, the subject matter of Example 38 optionally includes, wherein the lightweight NAS protocol supports a reduced set of NAS messages for CIoT devices exclusive of mobile NAS messages.

In Example 40, the subject matter of Example 39 optionally includes, wherein the first reference point is a narrow-band air interface between the CIoT UE and the CIoT eNB, and wherein the mobile NAS messages including at least one of attach or tracking area update (TAU).

In Example 41, the subject matter of any one or more of Examples 38-40 optionally include, the machine readable medium including instructions that, when executed by the CIoT eNB, configure the CIoT eNB to: modify an existing NAS message to include data for communication to the CIoT UE.

In Example 42, the subject matter of any one or more of Examples 38-41 optionally include, wherein the existing NAS message includes an attach message, a service request message, or a periodic tracking area update (TAU) message.

In Example 43, the subject matter of any one or more of Examples 38-42 optionally include, the machine readable medium including instructions that, when executed by the CIoT eNB, configure the CIoT eNB to: receive data for communication to the network in a modified NAS message from the CIoT UE.

In an example, a system or apparatus can include, or can optionally be combined with any portion or combination of any portions of any one or more of the examples illustrated above to include, means for performing any one or more of the functions of the examples illustrated above, or a non-transitory machine-readable medium including instructions that, when performed by a machine, cause the machine to perform any one or more of the functions of the examples illustrated above.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An apparatus of a mobility management entity (MME), the apparatus comprising:
    memory; and
    processing circuitry coupled to the memory wherein to transfer data in Non-Access-Stratum (NAS) protocol data units (PDUs), the processing circuitry is configured to:
    decode an attach request, sent from a user equipment (UE), the attach request indicating the UE supports a cellular internet-of-things (CIoT) optimization;
    encode, for transmission to the UE, an attach accept message based on the attach request;
    decode an attach complete message, sent from the UE, based on the attach accept message;
    decode an initial UE message, the initial UE message sent from the UE over an a radio resource control (RRC) connection, the initial UE message including a NAS PDU, and the NAS PDU including encrypted uplink data, the NAS PDU received from the UE without establishment of a bearer in accordance with the CIoT optimization, the NAS PDU comprising an identity of a bearer for a packet data network (PDN) connection associated with the uplink data;
    check integrity of the NAS PDU;
    decrypt the encrypted uplink data from the NAS PDU, wherein the memory is configured to store the decrypted uplink data; and
    encode the decrypted uplink data for transmission to a PDN gateway (P-GW).

2. The apparatus of claim 1, wherein the NAS PDU includes an acknowledgment or response indication.

3. The apparatus of claim 2, wherein the processing circuitry is configured to release a signalling connection for the UE based on the acknowledgement or response indication, and
    wherein if the NAS PDU does not include release information, the acknowledgement includes an indication of a bearer established for further uplink data transmission.

4. The apparatus of claim 2, wherein the processing circuitry is configured to:
    decode downlink data in response to the decrypted uplink data;
    encrypt the downlink data; and
    encode a downlink NAS PDU that includes the encrypted downlink data for the UE.

5. The apparatus of claim 4, wherein the processing circuitry is configured to:
    determine no NAS PDU activity for a time period; and
    release a signalling connection for the UE based on the no NAS PDU activity for the time period.

6. The apparatus of claim 1, wherein the processing circuitry is configured to update a location of the UE based on a change in a location of the UE.

7. The apparatus of claim 1, wherein the attach request indicates a packet data network (PDN) connectivity request and a PDN type information element (IE) for a type of address.

8. The apparatus of claim 7, wherein the PDN type IE indicates an IPv4 address or IPv6 address.

9. The apparatus of claim 7, wherein the processing circuitry is configured to establish a default bearer based on the PDN connectivity request.

10. A computer-readable storage medium that stores instructions for execution by processing circuitry of a mobility management entity (MME) to configure to transfer data in Non-Access-Stratum (NAS) protocol data units (PDUs), the processing circuitry configured to:
    decode an attach request, sent from a user equipment (UE), the attach request indicating the UE supports a cellular internet-of-things (CIoT) optimization;
    encode, for transmission to the UE, an attach accept message based on the attach request;
    decode an attach complete message, sent from the UE, based on the attach accept message;
    decode an initial UE message, the initial UE message sent from the UE over an a radio resource control (RRC) connection, the initial UE message including a NAS PDU, and the NAS PDU including encrypted uplink data, the NAS PDU received from the UE without establishment of a bearer in accordance with the CIoT optimization, the NAS PDU comprising an identity of a bearer for a packet data network (PDN) connection associated with the uplink data;

check integrity of the NAS PDU;

decrypt the encrypted uplink data from the NAS PDU; and encode the decrypted uplink data for transmission to a PDN gateway (P-GW).

11. The computer-readable storage medium of claim 10, wherein the NAS PDU includes an acknowledgment or response indication.

12. The computer-readable storage medium of claim 11, wherein the processing circuitry is configured to release a signalling connection for the UE based on the acknowledgement or response indication, and wherein if the NAS PDU does not include release information, the acknowledgement includes an indication of a bearer established for further uplink data transmission.

13. The computer-readable storage medium of claim 11, wherein the processing circuitry is configured to:

decode downlink data in response to the decrypted uplink data;

encrypt the downlink data; and encode a downlink NAS PDU that includes the encrypted downlink data for the UE.

14. The computer-readable storage medium of claim 13, wherein the processing circuitry is configured to:

determine no NAS PDU activity for a time period; and release a signalling connection for the UE on the no NAS PDU activity for the time period.

15. The computer-readable storage medium of claim 10, wherein the processing circuitry is configured to update a location of the UE based on a change in a location of the UE.

16. The computer-readable storage medium of claim 10, wherein the attach request indicates a packet data network (PDN) connectivity request and a PDN type information element (IE) for a type of address.

17. The computer-readable storage medium of claim 16, wherein the PDN type IE indicates an IPv4 address or IPv6 address.

18. The computer-readable storage medium of claim 16, wherein the processing circuitry is configured to establish a default bearer based on the PDN connectivity request.

* * * * *